Nov. 29, 1955   L. I. PICKERT ET AL   2,725,261
BRAKE CYLINDER RELEASE VALVE
Filed Nov. 17, 1952
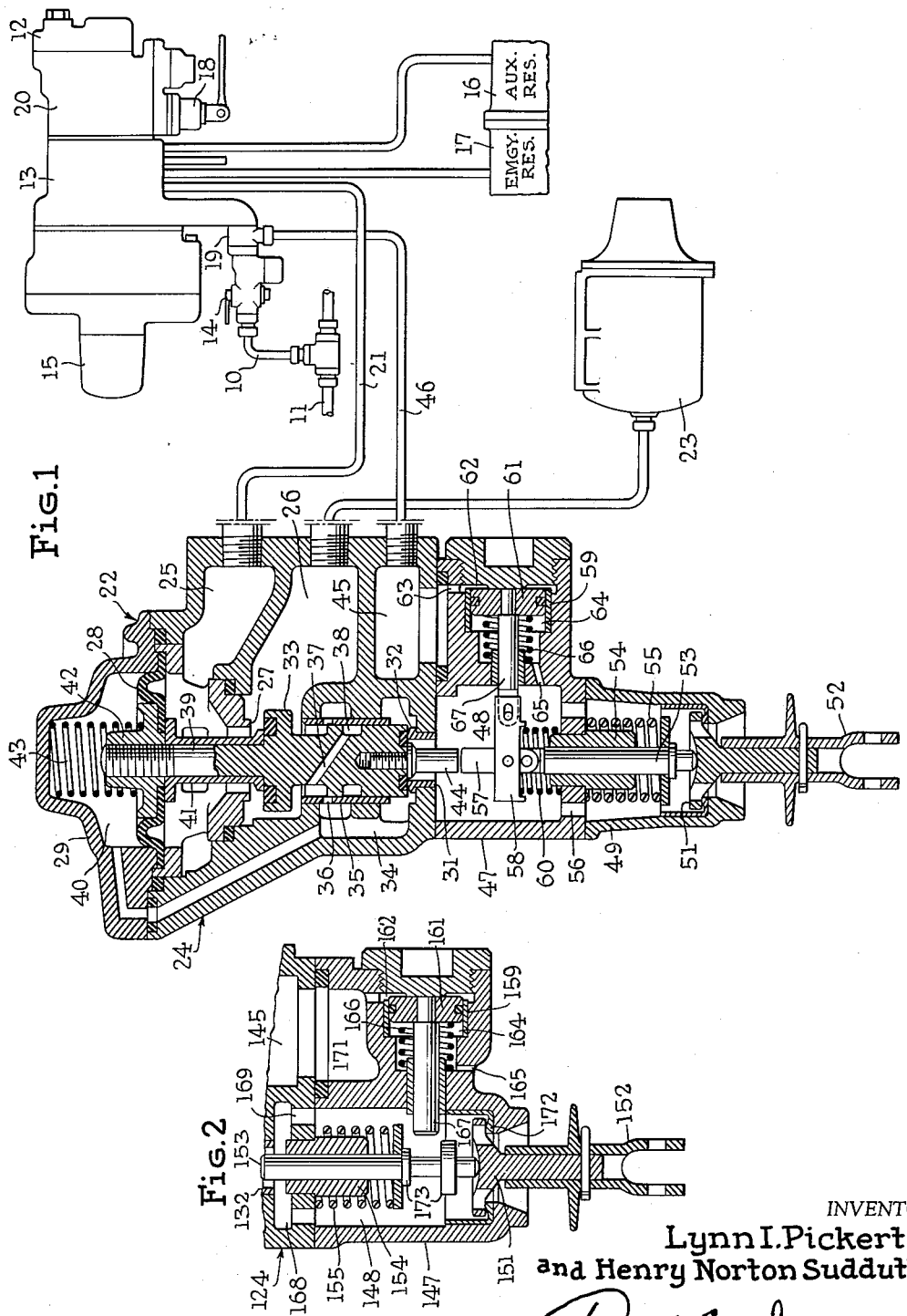
INVENTOR
Lynn I. Pickert
and Henry Norton Sudduth
BY Dodge and Sons
ATTORNEYS

United States Patent Office 2,725,261
Patented Nov. 29, 1955

2,725,261

BRAKE CYLINDER RELEASE VALVE

Lynn I. Pickert and Henry Norton Sudduth, Watertown, N. Y., assignors to The New York Air Brake Company, a corporation of New Jersey Application November 17, 1952, Serial No. 320,876

7 Claims. (Cl. 303—68)

This invention relates to fluid pressure brakes. Specifically it relates to an improvement to release valves of the type shown in the patents to Pickert No. 2,302,377 dated November 17, 1942, and 2,392,185 dated January 1, 1946, which issued to The New York Air Brake Company, the assignee of the present invention.

Release valves of the type shown in each of the above patents comprise a normally open motor operated valve interposed in the connection between the brake cylinder and the triple valve of a conventional fluid pressure brake system. The pressure motor is normally inert but may be energized if the brakes are applied by shifting a manually operated valve. When the motor is energized the normally opened valve is held in a closed position in which the connection from the triple valve is closed and the brake cylinder is vented to atmosphere.

Release valves of this type are primarily useful to release pressure from the brake cylinders of a freight car which has been cut out of a train. The great advantages afforded by this type of valve are that the partial charge remaining in the auxiliary and emergency reservoirs after an emergency application of the brakes is conserved, and that the device is self-restoring. A release valve of this type may also be used to vent pressure from the brake cylinder of a stuck brake. It has been suggested that use of the release valve for this purpose may create a potentially dangerous condition. The conditions under which this could occur are such that their simultaneous occurrence is unlikely. The present invention relates to an apparatus which will prevent the brake cylinder release valve being used to release stuck brakes.

In order better to understand the purpose of the invention, a hypothetical example of the conditions giving rise to the dangerous condition will be explained.

Let it be assumed that a freight train is approaching the crest of a downhill grade. Let it further be assumed that the condition of the train is such that as it approaches the crest of the grade the leakage from the brake pipe is increased and that the feed valve is operating in a manner such that brake pipe pressure cannot be maintained against this additional leakage. Under these circumstances the brake pipe pressure will be reduced causing control valves in the region of the pressure reduction to move to application position. Flow of pressure from the auxiliary reservoir to the brake cylinders will occur as a result of this movement and will continue until the triple valve moves to lap position, as a result of equalization of auxiliary reservoir and brake pipe pressures. Thus it will be seen that some of the brakes in the train will be applied. Such dragging of the brakes would be particularly objectionable when a train is approaching the crest of a hill and a trainman might under the circumstances operate the brake cylinder release valve to vent this pressure. This would isolate the brake cylinder from the control valve.

If the train then continued over the crest of the hill and started its downward journey, some of the brakes in the train would be inoperable. In order to restore these brakes to operation it would be necessary for the engineer first to apply the brakes and then release them in order that the brake cylinder release valves which had been operated would be restored to their normal position. Obviously this expedient would be undesirable during downhill operation of the train.

The present invention contemplates the addition to such release valves of a fluid pressure motor energized from the brake pipe and effective when energized to disable the manually operated means of the release valve.

The pressure requisite to energize this motor could be any pressure lower than the lowest brake pipe pressure encountered during normal service operation of the brakes, i. e. the pressure existing during a full service brake application. In the preferred embodiment of the invention this pressure is slightly above atmospheric. Obviously a higher pressure could be selected so long as it is below the defined maximum.

The invention will be described having reference to the accompanying drawing in which Fig. 1 is a schematic showing partially in section of the brake equipment of a single freight car embodying the present invention. The brake cylinder release mechanism is shown on a larger scale than the rest of the system in order to facilitate description of the invention.

Fig. 2 is a fragmentary view showing a modified form of the invention.

Referring first to Fig. 1 the fluid pressure brake system comprises a normally charged brake pipe 11. Brake pipe 11 is connected to a conventional AB control valve through the branch pipe 10 and the branch pipe cut-out cock 14. The control valve 12 includes a pipe bracket portion 13, a service portion 20, and an emergency portion 15. Pipe connections extend from the bracket 13 to the auxiliary reservoir 16 and to the emergency reservoir 17. The portion 20 also includes the well-known reservoir bleed valve 18.

Interposed between the cut out cock 14 and the bracket 13 is a filler piece 19, the purpose of which will be described.

A brake cylinder connection 21 extends from the pipe bracket 13 to the brake cylinder release valve 22 and through that valve to the brake cylinder 23. The release valve 22 comprises a body 24 having cored chambers 25 and 26 which are respectively connected to the brake cylinder connection 21 and to the brake cylinder 23. Interposed between the chambers 25 and 26 is a downward presented valve seat 27. The upper face of the chamber 25 is closed by a flexible diaphragm 28 which is clamped between the body 24 and the cap 29. In the lower portion of the body 24 is a bushing 31 having at its upper edge a valve seat 32. A double beat poppet valve 33 is reciprocable between a lower normal position in which it seats against the valve seat 32 and an upper abnormal position in which it seats against the valve seat 27. Provided in the lower portion of the body 24 is a cored chamber 34 in which is received a cylindrical bushing 35 encircling the valve 33. The chambers 34 and 26 communicate with each other through a port 36 in the bushing 35. When the double beat poppet valve 33 is in its abnormal position communication between these chambers is afforded through the diagonal port 37 in the poppet valve, the annular chamber 38 and port 36. The working space 40 above the diaphragm 28 is in constant communication with the chamber 34.

The double beat poppet valve 33 is provided with a stem 39 which extends upward through the center of the diaphragm 28. Stem 39 is encircled by a flanged spacer 41. A combined diaphragm follower and nut 42 is threaded onto the upper end of the stem 39 and serves to clamp the inner periphery of the diaphragm 28 between the follower and the flange on the spacer 41. A compression spring 43 is biased between the follower 42 and the cap 29. Projecting from the lower end of the valve 33 through the valve seat bushing 31 is a valve stem 44.

The brake system and the release valve as thus far described are conventional except for the provision of the filler piece 19 and no claim is made to their operation apart from the invention described in this specification.

Body 24 includes an additional cored chamber 45 connected to the filler piece 19 by a pipe 46. Attached to the lower face of the body 24 is a spacer 47. The spacer 47 encloses a chamber 48, the upper end of which communicates with the valve seat 32. A housing 49 of the form shown is attached to the lower face of the spacer 47. The housing 49 has an internal flange at its lower end on which is mounted a universally tiltable actuator comprising a ported head 51 which seats at its margin on the internal flange and which has at its lower end a fork 52 to which an actuating lever may be attached. Resting on the tiltable head 51 is the lower end of a stem 53 which is guided in a bushing 54 pressed into an opening in the lower face of the spacer 47. The stem 53 is biased against the head 51 by a compression spring 55. The interior of the housing 49 is in communication with the chamber 48 through the ports 56. Hinged to the upper end of the stem 53 is a link 57. The link 57 is provided with a cross head 58 pivoted thereon as is clearly shown in the drawing.

A motor chamber 59 is formed in the spacer 47 and a motor piston 61 is reciprocable therein. The motor space 62 communicates with chamber 45 through port 63. The idle space 64 is vented to atmosphere through port 65 which opens into the chamber 48. The piston 61 is biased toward the motor space 62 by a spring 66. A thrust rod 67 is attached between the piston 61 and the cross head 58, there being provided some lost motion in this connection. A spring 60 reacts on the lower surface of cross head 58 and urges the link 57 toward a position in which it alines with stem 44.

The invention has been illustrated with the parts in the position they would assume when an emergency application of the brakes is in effect. That is to say, the brake cylinder 23 is charged and the brake pipe 11 is vented to atmosphere. It will be seen that under these conditions the chambers 25, 26, and 34 and the working space 40 are equally charged with pressure fluid. Therefore the double beat poppet valve 33 is retained in its normal position by spring 43. The pressure in the brake cylinder 23 may be released by pulling the actuating lever attached to the fork 52. The universally tiltable head 51 raises the stem 53 and reacts against the stem 44 through the link 57 to unseat the valve 33 from the valve seat 32. When the valve 33 is unseated the working space 40 is vented through the space 34 past the valve seat 32 to atmosphere. Thus a pressure differential is created on the diaphragm 28 and the valve 33 is raised to its abnormal position and seats against the valve seat 27 thus isolating the chamber 25 and the brake cylinder connection 21 from the chamber 26 and the brake cylinder 23. It will be seen that the chamber 26 which is in constant communication with the chamber 34 is also vented to atmosphere through valve seat 32.

When the brakes are released the control valve 12 is moved to its release position by rising brake pipe pressure. In its release position the control valve operates to vent the chamber 25 and the pipe 21. The spring 43 restores the valve 33 to its normal position. Rising brake pipe pressure also is effective in the motor chamber 62 to shift the piston 61 against the bias of the spring 66 to swing the link 57 to a position in which it is no longer alined with the projection 44. When the link 57 is so positioned it is impossible to shift the double beat valve 33 to its abnormal position.

The bias of the spring 66 is so chosen that the piston 61 is maintained in a position to disable the actuating mechanism at all times when brake pipe pressure is equal to or above the minimum which is characteristic of normal service braking operation. From this it will be seen that if a full service application of the brakes is made the reduction of the brake pipe pressure is insufficient to permit the bias of the spring 66 to move the piston 61 to the position shown in the drawing. Therefore the brake releasing mechanism cannot be actuated to release the pressure in the brake cylinders.

The modification shown in Fig. 2 operates on the same principle. In this modification the lower face of the body 124 is slightly modified there being a chamber 168 beneath the valve seat 132 from which extends a plurality of ports 169. A guide 154 is pressed into an opening in the lower face of the body 124. A housing 147, attached to this lower face, includes a chamber 148 in communication with the chamber 168 and a chamber 171 in communication with the chamber 145 which is connected to the brake pipe. The chamber 148 is provided at its lower end with an internal flange 172 on which is mounted the universally tiltable ported head 151. A stem 153 is guided in the guide 154 and biased into engagement with the head 151 by a spring 155. The stem 153 is provided with a pair of spaced annular shoulders 173.

A cylinder bore 159 is formed in the housing 147. A motor piston 161 is reciprocable in this cylinder bore and divides it into a working space 162 in communication with the chamber 145 and an idle space 164 vented to atmosphere through port 165. A thrust rod 167 is secured to the piston 161 and is engaged between the annular shoulders 173 when the motor working space 162 is charged with a pressure sufficient to overcome the bias of spring 166.

It will be seen that the modification shown in Fig. 2 affords a positive lock which holds the stem 153 in its lowermost position. Hence the actuating lever 152 cannot be moved. The form shown in Fig. 1 is preferred to that shown in Fig. 2 because the latter could through abuse be caused to malfunction. Specifically the exertion of excessive force on the actuating lever could cause the thrust rod 167 to be bent whereby the motor piston 161 would be ineffective to retract it.

In either modification the spring 66 or 166 preferably exerts a relatively light bias on the piston 61 or 161 so that the manual actuating means of the mechanism is effective only when the brake pipe is substantially completely vented. The selection of this light bias effectively limits use of the release valve to periods when an emergency brake application is in effect.

It should be noted that although the use of the release valve to prevent release of stuck brakes is prevented by the present invention, a stuck brake may be released by actuating the reservoir bleed valve 18. The exact location of the pipe 46 relative to the control valve is of secondary importance. However, it is preferred to connect it to the control valve at a point such that when the cut out cock 14 is closed the connection 46 is isolated from the brake pipe 11.

It will be apparent to any one skilled in the art that there are pressures established in other components of the system which occur only as a result of an emergency brake application. For example emergency reservoir pressure is reduced only during an emergency application. The piston 61 (or 161) could be actuated in response to variations of this pressure. Similarly brake cylinder pressure is higher during an emergency brake application than it is during service applications. It would be an easy matter to provide a communication between chamber 25 and a pressure motor similar to the motors illustrated in the drawings. While the latter would seem desirable because it eliminates the additional pipe connection between the control valve 12 and the release valve 22, it would be impractical because the brake cylinder pressure is a function of brake pipe pressure which under conventional present day railroading practice may vary between pressure as low as 70 p. s. i. and as high as 110 p. s. i. Standardization of brake pipe pressure would permit practical usage of either emergency reservoir or brake cylinder pressure variations to control operation of the release valve mechanisms as outlined above. However, until such a practice is established, the illustrated apparatus is preferred because a single motor spring can be used regardless of the brake pipe pressure employed.

It will be apparent also that the present invention could be embodied in brake release valves constructed according to the teachings of the Klein Patent Number 2,444,993, dated July 13, 1948, which issued to applicants' assignee. Such use is within the contemplation of the present invention.

What is claimed is:

1. In a fluid pressure brake system of the type including a normally charged brake pipe; a control valve; an auxiliary reservoir; an emergency reservoir and a brake cylinder; a self-restoring brake cylinder release mechanism interposed between said brake cylinder and the connection thereto from said control valve, said mechanism comprising a two position valve having a normal position in which it permits flow between said connection and the brake cylinder and an abnormal position in which it prevents such flow; a normally inert pressure motor connected with said two-position valve and having two working spaces, the first of which is in constant communication with said connection and the second of which is in communication with said connection when said two-position valve is in its normal position; normally closed valve means shiftable to vent the second working space and said brake cylinder, venting of the second working space energizing said motor and shifting the two-position valve to its abnormal position; actuating means to open the normally closed valve means; and fluid pressure motor means normally effective to prevent opening of said valve means and effective only when actuated to permit opening of said valve means by operation of said actuating means, said motor means being actuated by a pressure which usually exists in the system only as an incident to an emergency application of the brakes.

2. The combination defined in claim 1 in which said actuating means comprises a shiftable thrust member; and the fluid pressure motor means is arranged to receive pressure from said brake pipe and connected with said member and effective to disable said thrust member unless brake pipe pressure is below a predetermined minimum.

3. A self-restoring brake cylinder release mechanism adapted for interposition in the connection between the control valve and the brake cylinder of a conventional automatic air brake system comprising in combination a two-position valve having a normal position in which it permits flow through said connection and an abnormal position in which it isolates the connection from the control valve and vents the connection from the brake cylinder; means biasing said two-position valve toward its normal position; a motor connected with said valve and having first and second working spaces respectively connected with the control valve connection and with the brake cylinder connection; manually operated thrust means whereby said two-position valve may be shifted toward abnormal position; fluid pressure motor means actuated by a pressure usually occurring in said system only as an incident to an emergency brake application, and normally effective to disable said thrust means and serving when actuated to render said thrust means effective.

4. The combination defined in claim 3 in which the fluid pressure motor means is adapted for connection to the brake pipe of said brake system; and a motor actuated element associated with the thrust means, said thrust means comprising a manually shiftable thrust rod and a link pivoted thereto and connected to said motor actuated element, said link being normally maintained by said element in a position in which it is ineffective, when shifted, to move said two-position valve toward abnormal position.

5. The combination defined in claim 3 and an element adapted, actuated by said motor means and when said motor is actuated to engage said thrust means and inhibit shifting thereof, said motor means being adapted for connection to the brake pipe of said system and actuated whenever pressure therein is above a predetermined minimum.

6. A self-restoring brake cylinder release valve adapted for interposition in the connection between the control valve and the brake cylinder of an automatic air brake system comprising in combination a double-beat poppet valve shiftable between a normal position in which it permits flow through said connection and an abnormal position in which it closes the connection from the control valve and vents the connection to the brake cylinder; means biasing the poppet valve to its normal position; a pressure motor connected with said poppet valve and having first and second working spaces which are respectively in communication with the control valve connection and the brake cylinder connection; manually operated means shiftable to move said poppet valve toward abnormal position; and motor means effective when actuated to disable said manually operated means, said motor means adapted to receive air from the brake pipe of said system and actuated when pressure in the brake pipe exceeds a predetermined minimum.

7. The combination defined in claim 6 in which the predetermined minimum pressure is less than that to which brake pipe pressure is reduced to produce a full service application of the brakes.

References Cited in the file of this patent

UNITED STATES PATENTS

| | | |
|---|---|---|
| 1,906,699 | Mallison et al. | May 2, 1933 |
| 2,392,185 | Pickert | Jan. 1, 1946 |